Sept. 12, 1961 HIDEO YAMANO 2,999,472
CHAIN STITCH APPARATUS IN CONVENTIONAL LOCK
STITCH SEWING MACHINES
Filed Oct. 5, 1959 5 Sheets-Sheet 1

INVENTOR
HIDEO YAMANO
By Wenderoth, Lind & Ponack
Att'ys.

INVENTOR
HIDEO YAMANO
By
Wenderoth, Lind & Ponack
Attys

United States Patent Office 2,999,472
Patented Sept. 12, 1961

2,999,472
CHAIN STITCH APPARATUS IN CONVENTIONAL LOCK STITCH SEWING MACHINES
Hideo Yamano, Minami-Hinokicho, Sakai City, Japan, assignor to Kabushiki Kaisha Tohoku Kosakusho, Sakai City, Japan
Filed Oct. 5, 1959, Ser. No. 844,449
Claims priority, application Japan Oct. 6, 1958
1 Claim. (Cl. 112—168)

This invention relates to chain stitch apparatus in conventional lock stitch sewing machines and its object is to provide a new chain stitch apparatus and means for ordinary or chain stitch to be performed at will.

With this object in view, the present invention provides a chain stitch apparatus in which a semi-annular oscillatory member having at its upper end a needle aperture formed by a pair of nails each provided with an outward projection on its outside, is fitted outside a shuttle, adapted to make oscillating motion.

According to the present invention, a semi-annular oscillatory member co-operating with a shuttle mechanism, performs chain stitch only with an upper thread, and ordinary stitch can also be done by stopping the operation of the oscillatory member. Besides, the structure of the device is very simple.

Other and the further objects of the present invention will become apparent from the following specification and claim taken together with the accompanying drawings in which is shown the preferred embodiment of the chain stitch apparatus in a conventional lock stitch sewing machine according to the present invention.

Figure 1:
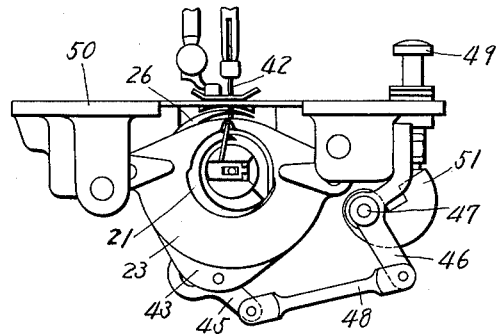
FIG. 1 is an elevation view of a part of a sewing machine of a type having a vertical shuttle capable of oscillating motion embodying the present invention.
Figure 2:
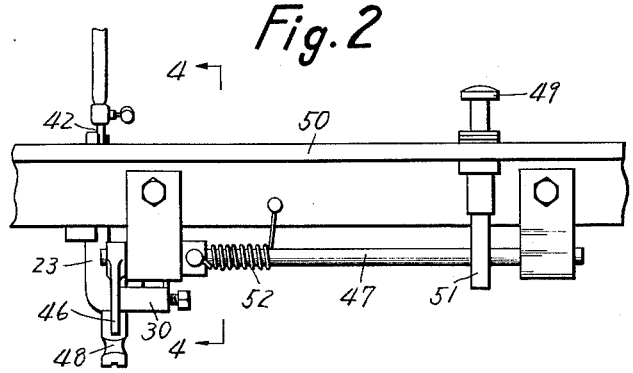
FIG. 2 is a side view of FIG. 1.
Figure 3:
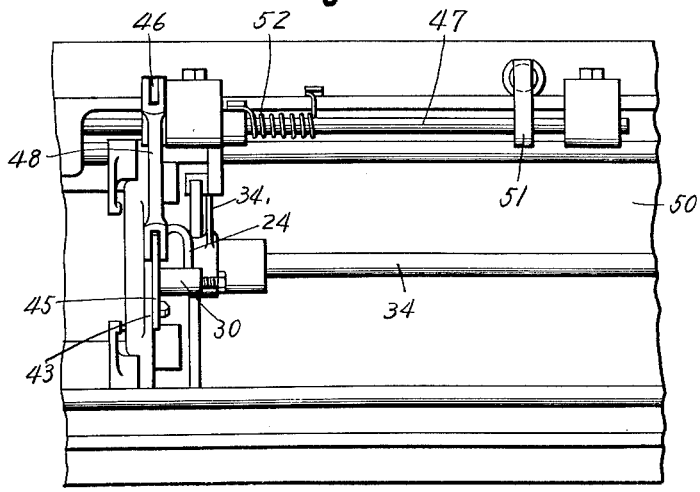
FIG. 3 is a reverse plan view of the same.
Figure 4:
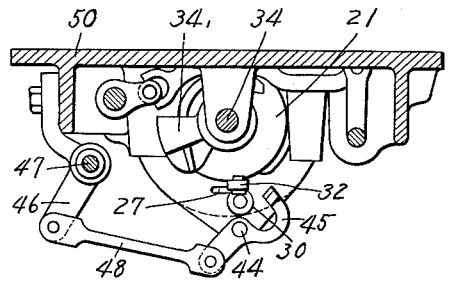
FIG. 4 is a sectional view taken on the line 4—4 of FIG. 2.
Figure 5:
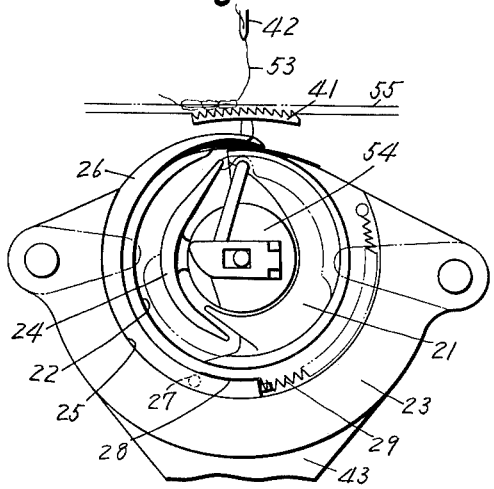
FIG. 5 is an enlarged view of a part of FIG. 1.

In these drawings, reference numeral 21 indicates a shuttle, which, fitted in a race way 22 of a shuttle race 23, makes oscillation driven by a shuttle driver 24. Outside the race way 22 is formed a guide way 25 of a larger diameter than that of the shuttle 21 and in this guide way 25 is fitted a semi-annular oscillatory member 26, capable of oscillating motion. A pin 27 fixed to the lower inside of the member 26, passing through a guide hole 28 made in the guide way 25 is pressed by a spring 29 against an end of the guide hole 28. Behind the shuttle race 23 is fixed a supporting piece 30 having a pin 31 fixed thereon, provided with a lever 32 pressed against a pin 27 by a spring 33.

Figure 8:
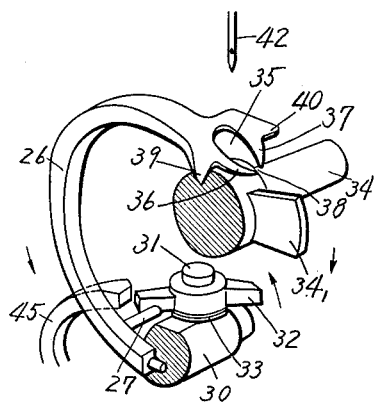
FIG. 8 is a perspective view of a principal part of a sewing machine according to the present invention.

As the elastic force of the spring 29 is greater than that of the spring 33, the member 26 in ordinary state keeps the position shown in FIG. 8. On a driver shaft 34 is fixed a push piece $34_1$ behind the shuttle driver 24. When the driver shaft 34 revolves in the direction of the arrow given in FIG. 8, the lever 32, turned by the push piece $34_1$, moves the member 26 in the direction of the arrow given in FIG. 8. When the lever 32 comes off the pin 27, the member 26 is turned back to the former position by the elastic force of the spring 29. And when the shuttle driver turns back, the lever 32 not engaging with the pin 27, the member 26 remains still. The upper end of the member 26 has an elliptical needle aperture 35 formed by a pair of nails 36, 37, of which the tips, curving inward, form a narrow thread way 38, and the outsides of which are each provided with a projection 39, 40 with its ends bent towards the thread way 38. In ordinary state the upper end of the member 26 is placed between a feed dog 41 and the shuttle 21, admitting the needle 42 coming down through the needle aperture 35.

On the lower surface of the shuttle race 23 is formed a supporting projection 43 with a rod 44 fixed thereon to which a lever 45 is attached. A lever 46 attached to a shaft 47 is connected with the lever 45 by a link 48. A push button 49 attached in a bed 50 is engaged with an engaging piece 51 of the shaft 47, which has a spring 52 for the engaging piece 51 to press the push button 49. When a push button 49 is pulled up, the lever 45 is drawn back off the lever 32, and the member 26 is free to work for chain stitch. When the push button 49 is pushed down and turns the shaft 47, the lever 45 turns the lever 32 to keep it out of contact with the push piece $34_1$ and the member 26 keeps back inactive, permitting conventional stitch.

In a sewing machine according to the present invention, as in a known type of one, an upper thread 53 passed through a needle co-operates with a lower thread of a bobbin fitted in a bobbin case 54 in the shuttle 21 to do conventional stitch while the push button is down. And when the push button is pulled up, chain stitch is performed with the upper thread 53 only, as shown below.

Figure 6:
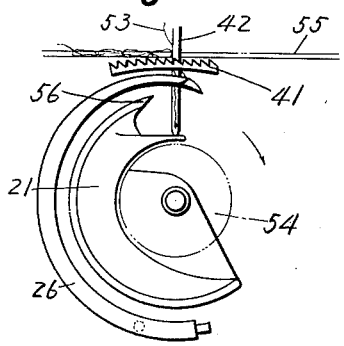
FIGS. 6 and 7 are elevation views showing operation of principal parts of a sewing machine according to the present invention.
Figure 7:
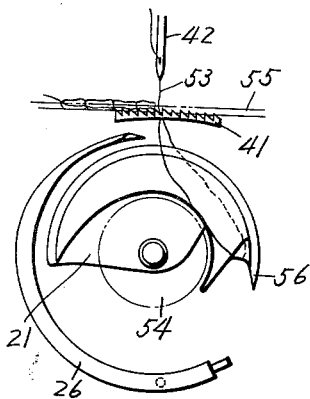
Figure 9:
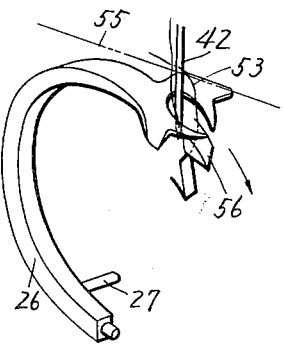
FIGS. 9 to 18 show the process of the chain stitch according to the present invention.
Figure 10:
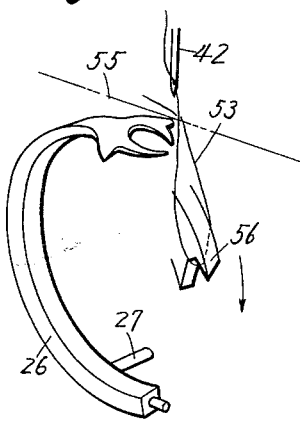
Figure 11:
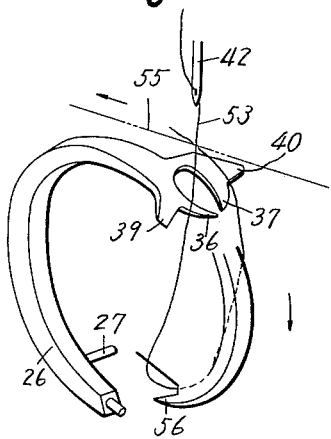

When the needle 42 with the thread 53 passed through it comes down through cloth 55 to its lowest position, a loop taker 56 of the shuttle 21, as shown in FIG. 6, lies short of the needle 42. When the needle 42 rises up from that position, the shuttle 21 begins to turn in the direction of the arrow and then the loop taker 56, as shown in FIG. 9, taking the thread 53 behind the needle 42, goes on turning forward in the direction of the arrow given in FIGS. 10 and 7. Then, the thread slacks, forming a loop round the shuttle 21, as shown in FIG. 11. When the shuttle 21 is in the position shown in FIGS. 7, 10, the member 26 recedes and in a moment comes back to the former position, but this process will be described hereinafter.

Figure 12:
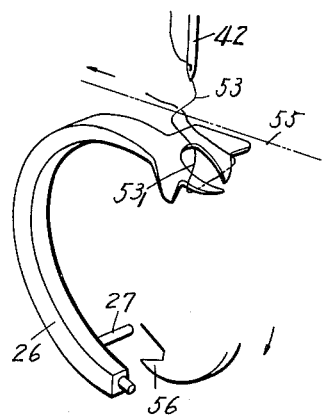
Figure 13:
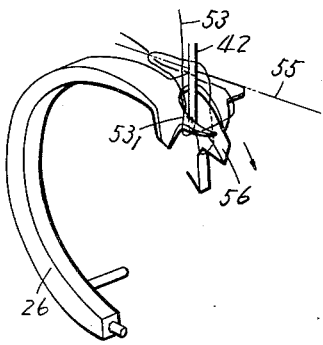
Figure 14:
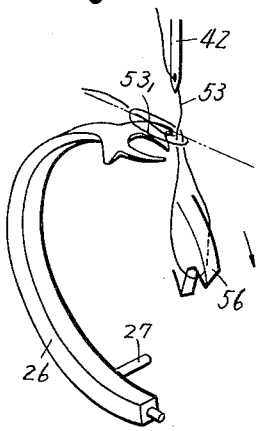
Figure 15:
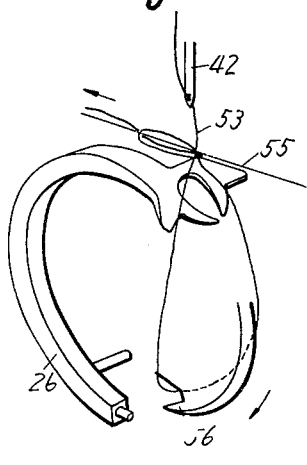
Figure 16:
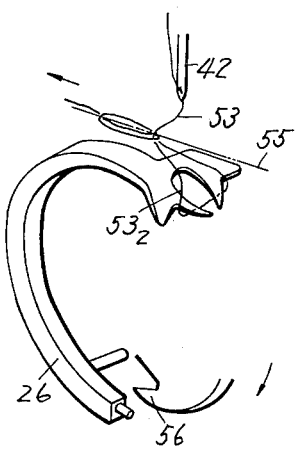
Figure 17:
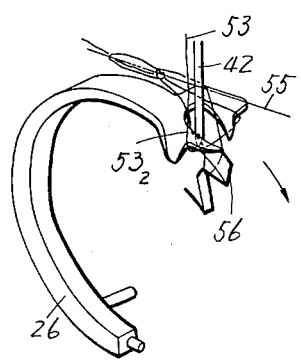
Figure 18:
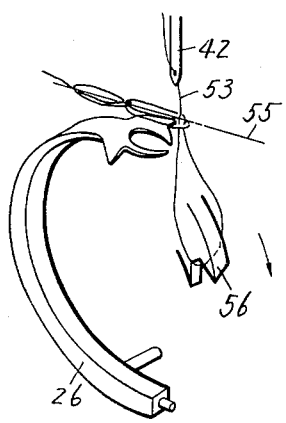

Whn the loop of the thread 53 is in the position shown in FIG. 9, its upper part is placed inside the nails 36, 37 and when the loop taker 56 of the shuttle 21 comes down to its lowest position shown in FIG. 12, the thread 53 comes up off the shuttle 21, forming a narrow loop $53_1$ caught by the projections 39, 40. At this moment the cloth 55 is fed one stitch ahead by the feed dog 41, the shuttle 21 turns back to the former position, and the needle 42 with the thread for the second loop, piercing the cloth 55, comes down through in the loop $53_1$ caught by the projections 39, 40, and with the ascent of the needle 42 the loop taker 56, taking the thread, turns on as shown in FIG. 13. FIG. 14 shows the state when the shuttle 21 turns on from the position of FIG. 13 and the member 26 recedes a moment. The loop $53_1$ coming completely off the nails 36, 37 gathers by the tension of the thread to make one stitch of sewing. The thread 53 passing through the loop $53_1$ is caught and carried by the loop taker 56 and slacks round the shuttle 21, its upper part being placed outside the nails 36, 37 of the member 26 which after receding has come back to the former position, a shown in FIG. 15. In FIG. 16 the thread is drawn up off the shuttle 21 to form a narrowed loop $53_2$ caught at the outside of the nails 36, 37. Then the cloth 55 is carried a stitch ahead by the feed dog 41 and the needle 42 with the thread for the third loop, piercing the cloth 55, comes down through the second loop $53_2$. The loop taken 56 of the shuttle 21 which has already come back to the former position begins to turn again, taking the thread for the third loop as shown in FIG. 17. FIG. 18 shows the member 26 receding and the loop $53_2$ coming off the nails 36, 37, making another stitch of sewing. When the process is repeated, there comes chain stitch according to present invention.

It is thought that the invention and its advantages will be understod from the foregonig description and it is apparent that various changes may be made in the forms, construction and arrangement of the parts without departing from the spirit and scope of the invention, the form hereinbefore described and illustrated in the drawings being merely a preferred embodiment thereof.

Having thus described my invention, what I claim and desire to secure by Letters Patent of the United States is:

In a lock stitch sewing machine having a shuttle and a drive shaft on which said shuttle is mounted, the combination of a raceway around said shuttle, an oscillatory member slidably mounted in said raceway, said oscillatory member having an elliptical needle aperture therein and a narrow thread opening extending from said needle aperture through one end of the oscillatory member, a projection on each side of said oscillatory member opposite said needle aperture for holding a thread, a pin adjacent the other end of said oscillatory member, a pivotally mounted lever having one end engaging said pin, a push piece on said shaft engageable with the other end of said lever for moving said lever so as to move said oscillatory member toward the said other end of said oscillatory member, spring means engaging the other end of said oscillatory member urging said oscillatory member in a direction opposite to the direction in which it is urged by said lever, a blocking member pivotally mounted for movement into and out of engagement with said lever for blocking the movement of said lever, spring loaded link means connected to said blocking member urging it into the blocking position, and a lever member connected to said link means for moving said link means against the spring loading thereof to move the blocking member out of the blocking position.

References Cited in the file of this patent

UNITED STATES PATENTS

| | | |
|---|---|---|
| 466,906 | Kohler | Jan. 12, 1892 |
| 809,660 | Ammerman | Jan. 9, 1906 |
| 859,423 | Ammerman | July 9, 1907 |
| 1,090,151 | Hohmann | Mar. 17, 1914 |